UNITED STATES PATENT OFFICE.

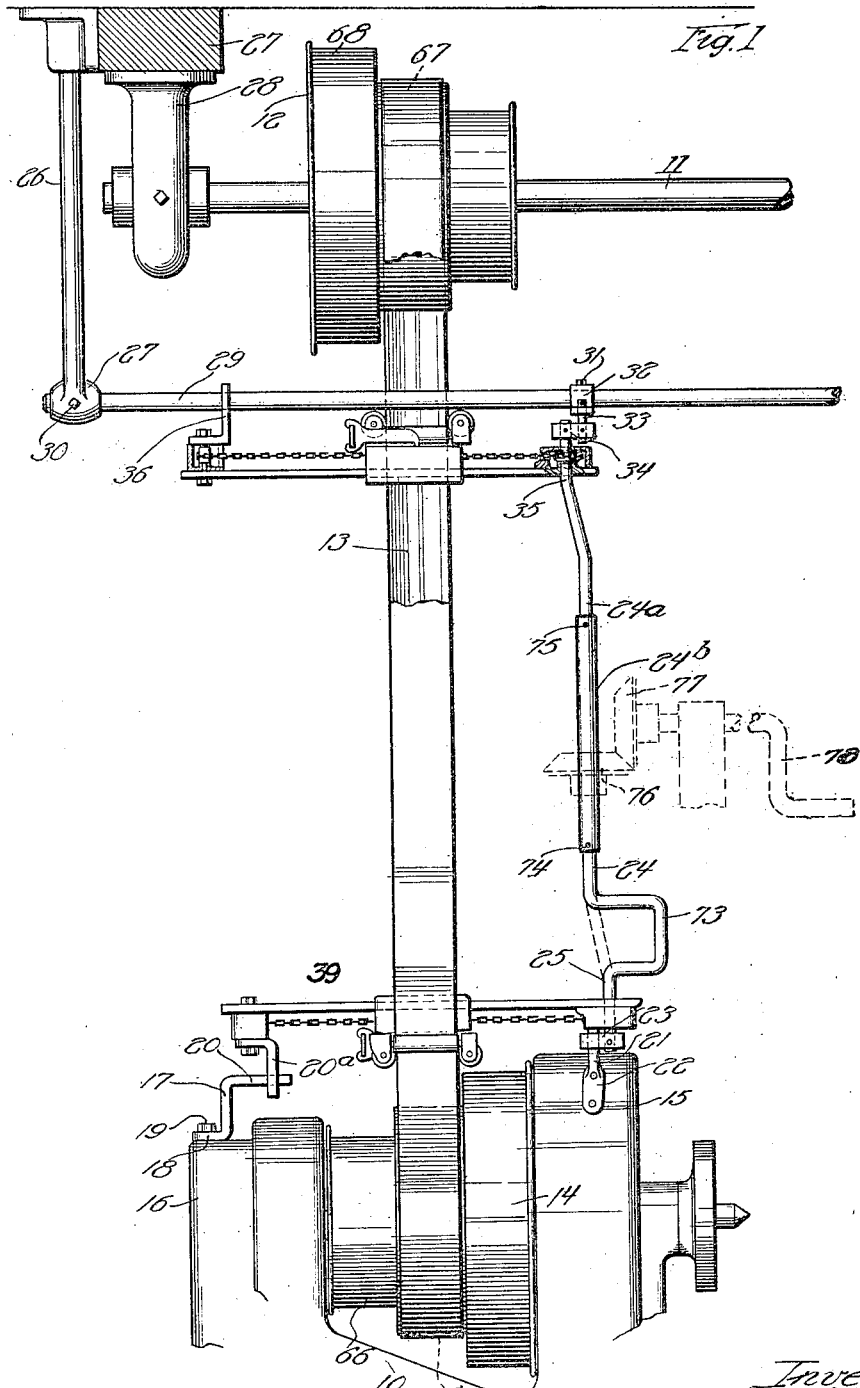

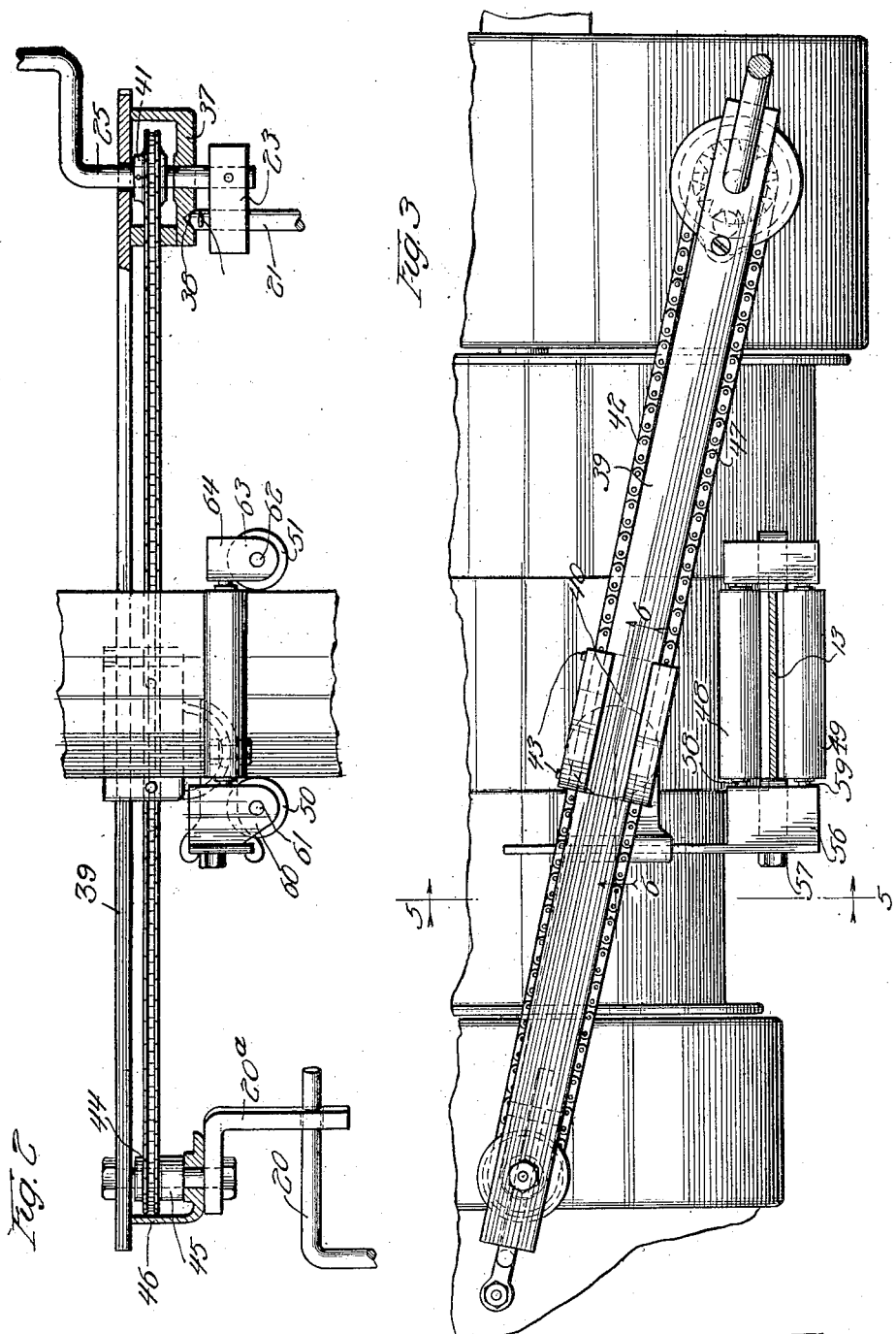

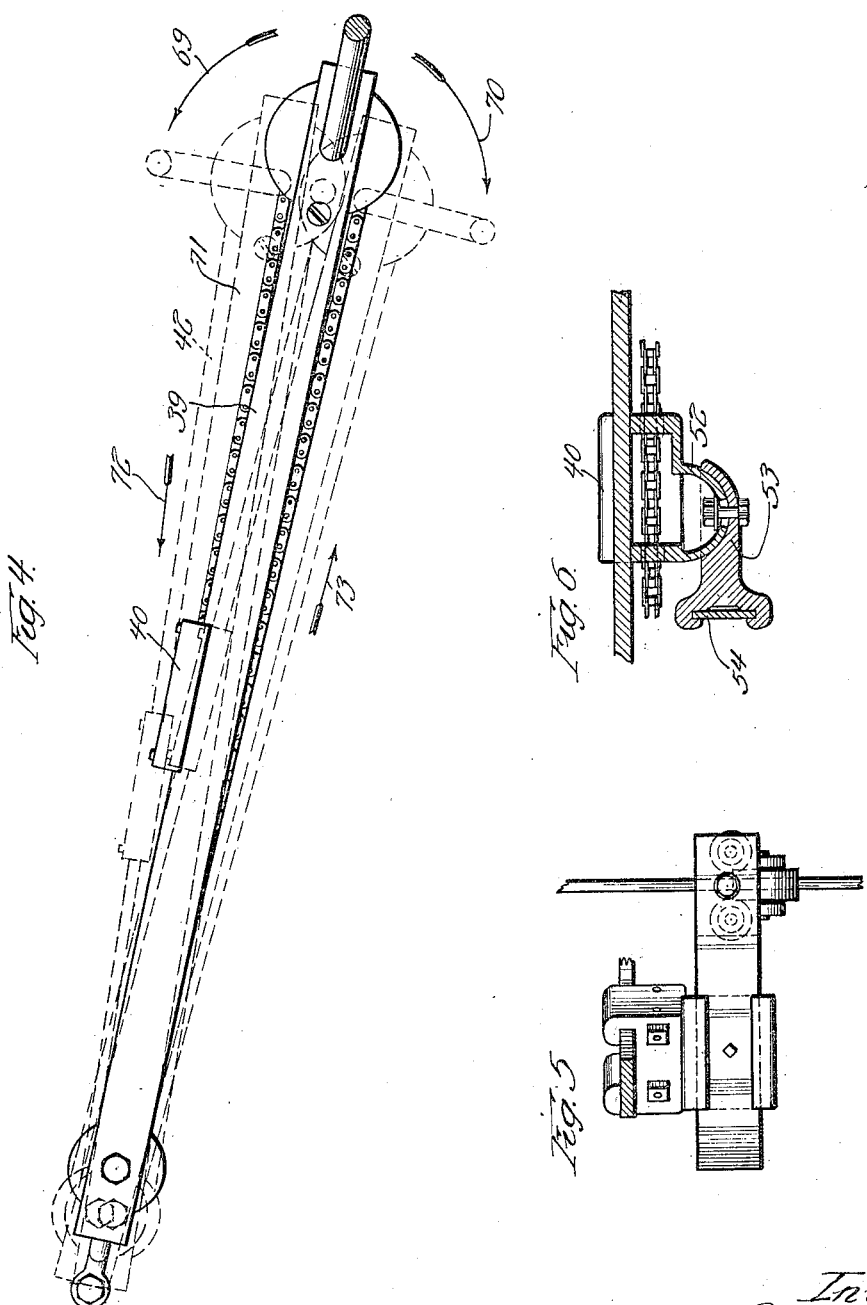

ROBERT SPURGIN, JR., OF CHICAGO, ILLINOIS.

BELT-SHIFTING DEVICE.

1,402,022.  Specification of Letters Patent.  Patented Jan. 3, 1922.

Application filed August 21, 1919. Serial No. 318,968.

*To all whom it may concern:*

Be it known that I, ROBERT SPURGIN, Jr., a citizen of the United States, residing at Chicago, in the county of Cook and State of Illinois, have invented certain new and useful Improvements in Belt-Shifting Devices, of which the following is a specification.

My invention relates to improvements in belt shifters and has particular reference to means for shifting belts used in conjunction with complementary stepped cone pulleys such as are used to effect the driving of machine tools at different speeds.

It will be understood that where a pair of stepped cone pulleys and a flexible belt are employed to transmit rotary movement between two shafts at different speeds, the change in speed is effected by changing the position of the belt on the steps of the cones. Such change of position, with a belt having the necessary driving tension must be accomplished by moving the belt at one end in a direction to cause it to develop the necessary slack before raising the other end of the belt on to a higher step of the cone. Obviously the belt cannot be raised on to a higher step of one of the cones until it is slack enough to permit such movement. Hence belt shifters designed for this purpose must necessarily embody an alternate movement, and if automatic in their action must provide for initial movement of the belt at that end which has to pass to a lower step of the cone before the position of the belt on the other cone is changed.

The principal objects of my invention are to provide an automatically effective belt shifter of the character described; to provide a belt shifter of the class described which shall occupy a minimum of space while at the same time it shall be applicable to all classes and sizes of machines and pulleys; to provide a construction which may be actuated by a stationarily mounted operating member; to provide a construction which may be quickly adjusted or applied to existing cone pulley drives without the necessity of reorganizing the drive or doing extensive mechanical work on the mountings thereof; to provide a construction which shall be simple in design and economical in manufacture and in general to provide an improved belt shifting device of the character referred to.

In the drawings which illustrate my improved belt shifter as applied to a lathe drive—

Fig. 1 is an assembly showing the parts in elevation;

Fig. 2 is an enlargement of the lower portion of the belt shifting apparatus shown in elevation in Fig. 1, certain parts being shown in section;

Fig. 3 is a plan view of the parts shown in Fig. 2;

Fig. 4 is a diagrammatic plan view showing the method of operation;

Fig. 5 is a section taken on the line 5—5 of Fig. 3; and

Fig. 6 is a section on the line 6—6 of Fig. 3.

Referring to the drawings 10 represents the head stock of a lathe which is to be driven from an overhead countershaft 11 by means of an upper stepped cone driving pulley 12 connected by a belt 13 to a lower stepped cone pulley 14 on the spindle of the lathe.

At the lower end of the apparatus the belt shifting apparatus is supported by parts bolted or otherwise secured to the large and small pedestals 15 and 16 of the head stock. The part secured to the small pedestal 16 comprises a small bracket 17 which takes the form of a rod of circular cross-section having a foot 18 secured to the top of the pedestal 16 by a cap-screw 19 passing through said foot. The small bracket 17 is made with an upstanding portion the end of which is bent over horizontally to form a round guide 20 for a sliding lug 20ª hereafter to be described. The part carried by the large pedestal 15 comprises a small upright pin 21 the lower end 22 of which is flattened and suitably curved to permit of its being bolted to said pedestal part 15. The upper portion of the vertical pin 21 constitutes a journal for a small arm or radius link 23 keyed to the lower extremity of an operating shaft. Said operating shaft is as to its intermediate portion 24 coaxial with the center of the supporting pin 21, the lower portion 25 of said shaft being of course offset or eccentric with respect to said pin 21.

The supporting means for the upper portion of the apparatus associated with the upper cone pulley 12 includes a suitable depending bracket or hanger 26 the upper end or foot of which is bolted to the ceiling of the shop or to the stringer 27 which carries the countershaft hanger 28. The vertical length of the hanger 26 is sufficient to bring its enlarged lower end 27 a short distance below the lowest portion of the cone pulley 12 and to accommodate a fixed horizontal supporting rod 29 the end of which is secured in said part 27 by means of a set-screw 30. I secure on the rod 29 by means of a set-screw 31 a small bracket or block 32 in the lower face of which there is upwardly drilled a cylindrical aperture which accommodates a fixed pivot pin 33, the pivot pin 33 being in the same vertical plane as the shaft 24 and the lower supporting pin 21. Said pivot pin 33 acts as a journal for the end of a crank arm or distance link 34 similar to the lower distance link 23 and which arm or link 34 is keyed to the upper end of a depending shaft 24$^a$, said upper end 35 being of course eccentric to the same extent as the eccentricity of the lower end 25. The two shafts 24 and 24$^a$ are connected to rotate in unison by means of a length of pipe 24$^b$ loosely keyed to the ends of said shafts.

It will be observed that the link 34 is disposed at an angle of 180° to the angular position of the lower link or arm 23. Said upper horizontal rod 29 besides acting as a support for the pivot block 32 also serves as a guide for a suitable apertured lug 36 similar in design and function to the lug 20$^a$ heretofore referred to. In all respects other than those heretofore referred to the operating parts of the mechanisms associated with the upper and the lower cone pulleys are similar. I will now describe the parts of the lower mechanism, it being understood that the same description will apply to the upper mechanism.

By reference to Fig. 2 it will be seen that the upper extremity of the supporting pin 21 acts as a stop for limiting the vertical movement in a downward direction of a gear housing 37 in which the lower end of the shaft portion 25 is journaled. The lower face of said housing 37 is made with a small depression 38 fitting the pointed upper end of the said pin 21 which thus acts as a lock to position the said gear housing 37.

It will be understood that by reason of the eccentricity of the axis of the housing 37 with reference to the pin 21 by reason of the crank or link element 23, the housing 37 is caused to move in a planetary fashion around the axis of the pivot pin 21 whenever the crank arm 23 rotates on said pin. The housing 37 by parts to be hereafter described is prevented from itself rotating on its own axis, this movement being of a substantially bodily character in an orbit represented by a circle the radius of which is the same as the effective length of the crank arm 23.

The housing 37 is prevented from rotating around its own axis by means of a horizontally disposed guide bar 39 to the left hand end of which is secured the guide lug 20$^a$ heretofore referred to. As in the present instance, the arrangement contemplates shifting the belt only when the lathe is running in the usual direction, i. e., with the rear side of the belt ascending, the lower guide bar is positioned in front of the lower cone and the upper guide bar is placed to the rear of the upper cone.

The right hand end of the guide bar 39 is bolted to the upper portion of the housing 37 which is of sufficient vertical depth to accommodate a rotary element 41 keyed or pinned to the lower end 25 of the operating shaft. By means of said rotary element 41 and a tie member connecting said rotary element 41 to the belt guide 40 the part 40 may be moved uniformly along the guide bar 39 due to the rotary movement of the member 41 in the housing 37. To effect this result the rotary member 41 has rolling engagement with said tie member which in the present instance takes the form of a flexible rack or chain 42 trained around gear teeth formed on the periphery of said rotary member or pinion 41.

In order to effect movement of the shifter element 40 when the pinion 41 is rotated in either direction, the chain 42 which is connected to the shifter slide 40 by suitable pins 43 is trained around a pulley 44 journaled on a pin 45 carried by the left hand or rear end of the said guide bar 39. Said pin or bolt 45 also secures the idler housing 46 and the guide lug 20$^a$ which reciprocates on the guide rod 20. It will be understood that the near side 47 slides past or through and is not otherwise connected to the slide 40 but simply serves as a return connection for the ends of the chain 42.

In order to prevent injury to the belt 13, I prefer to employ an anti-friction belt fork, said belt fork comprising in the present instance a pair of long rollers 48 and 49 for the opposite sides of the belt and a pair of end rollers 50 and 51 for engaging the edges of said belt 13. Said rollers are supported in the following manner: Referring particularly to Fig. 6, it will be observed that the slide 40 is made with a lower depending bell-shaped or spherical portion 52 which co-operates with a spherical recess in the end of an arm 53 to form a ball and socket joint whereby said arm 53 may be adjusted to any angle with respect to the slide 40. The outer end of said arm 53 is formed with a guideway which slidably supports a horizontally disposed bar 54. Said sliding arrangement permits the belt guide to accommodate itself to the movement of the belt toward or from the axis of the cone. The front end of the adjustable bar 54 is equipped with a small casting 56 secured thereto by a clamping bolt 57, said casting 56 serving as a support for the pins 58 and 59 upon which the rollers 48 and 49 are respectively journaled. The block or yoke 56 is also made with a pair of depending lugs 60 between which the roller 50 is journaled on a pin 61. The roller 51 is carried by and similarly journaled upon a pin 62 extending between spaced lugs 63 depending from a block or yoke 64 supported by, and connecting the outer ends of, the pins 58 and 59.

It will be understood that in a functional sense the shifting mechanisms for the two cone pulleys are, except for certain differences in arrangement, due to the overhead position of the upper gearing, substantially identical. The important distinction in a functional sense when considering the operation of the device as a whole is in the arrangement of the crank arms 23 which as previously stated project in diametrically opposite directions. I will now describe the manner of operation of the various parts.

Normally the parts are in the position shown in Fig. 1 and in full line position shown in Fig. 4. Assuming now that it is desired to move the belt in a direction to cause the lathe to run at a high speed. To effect this result it is necessary first to move the lower end of the belt from the intermediate step 65 to the smaller step 66, and after slack has thus been developed in the belt it is then possible to move the upper part of the belt from the intermediate step 67 to the larger step 68. This is effected by rotating the shaft 24 in the direction of the arrow 69 (see Fig. 4), it being understood that movement in said direction results in an increase in the speed of the lathe wheel, as will hereinafter appear, while movement in the direction of the arrow 70 will cause the lathe to run at a less speed.

Movement of the shaft 24 is normally prevented by reason of the locking engagement between the pointed upper end of the pivot pin 21 and the recess in the underside of the housing 37 which constitutes a safety lock preventing movement of said shaft 24 except when given a sharp jerk or a combined lifting and rotary movement. When said shaft is rotated in the direction of the arrow 69 there will be two movements as a result. There will be a planetary movement of the housing 37 around the pivot point 21 and there will be a rotary movement of the pinion 41 in said housing. The housing or right hand end of the guide bar 39, which fuctionally is the same as the housing, will therefore swing planetarily into the dotted line position represented by 71 in Fig. 4 and the gear or pinion 41 will also rotate in the housing in the direction of the arrow 69. Since the guide bar 39 carries the housing 37, pinion 41 and chain 42, the bodily movement in the direction of the arrow 72 which is thus imparted to the guide bar 39 by the planetary movement of the housing 37 will be communicated to the belt slide 40, in addition to which, by reason of the rotary movement of the pinion 41 in the housing, the chain 42 will also move in the direction of the arrow 72 with reference to said guide bar 39; hence during the first 180° of movement of the shaft 24 in the direction of the arrow 69 the belt slide 40 will be moved an amount equal to twice the throw of the crank 23 plus half the circumference (measured on the pitch circle) of the pinion 41.

During the second 180° movement of the shaft 24 in the direction of the arrow 69 the chain 42 will continue its movement in the direction of the arrow 72 with reference to the guide bar 39 but said guide bar 39 will be moved in the direction of the arrow 73 and therefore during said return movement of the guide bar the movement of the chain with reference to the bar 39 and the movement of the bar, which is in the opposite direction, will cancel each other and there will be no further effective movement of the slide 40 during the second half revolution of the shaft 24, the crank arm 23 being so constructed that its effective length is substantially equal to one-fourth of the circumference of the pinion 41 measured on the pitch circle.

It will be understood that by reason of the diametrically opposite disposition of the crank arm 34 of the upper mechanism the effective movement of the belt guide will be exactly the reverse of that in the lower mechanism, the first half of the revolution serving to impart substantially no effective movement to the belt shifter, while during the second half of the revolution of said shaft 24 in the direction of the arrow 69 the shifter will move an amount equal to the travel of the lower guide during the first half of the revolution. Hence during the first half of the revolution of the shaft 24 in the direction of the arrow 69 the lower belt guide will be moved to the left for the full amount of its travel and the upper belt guide will be stationary, while during the second half of the revolution the upper belt guide will move and the lower belt guide will be stationary.

It will be understood that when the operating shaft is moved in the opposite direction, i. e., in the direction of the arrow 70, the operation is exactly the reverse of that just described.

Any convenient means may be employed for rotating the shaft 24. In the present instance I have shown as the simplest means a hand crank 73 located just above the face plate of the lathe, which is a convenient location for the operator. It will of course be understood that the motion imparted to the shaft 24 by the crank 73 is transmitted to the upper shaft 24ª by means of the connecting member 24ᵇ, the latter driving the upper section through the pins 74 and 75.

It will be observed that the connecting member 24ᵇ takes the form of a sleeve in the ends of which the upper end of the shaft 24 and the lower end of the upper shaft 24ª are inserted. It will be observed that this arrangement enables the shafts 24 and 24ª to be made of standard length and construction, differences in the distance between, or spacing of, the cone pulleys being taken care of by telescoping one or both of the shafts more or less in the ends of said sleeve.

It will also be noted that the sleeve or connecting member 24ᵇ, when connected to the shafts 24 and 24ª by the pins 74 and 75, constitutes, when assembled, a single unitary part or shaft, which normally serves to support the upper and lower belt shifting mechanisms against lateral movement or displacement.

It will be manifest that by reason of the shafts 24 and 24ª being axially stationary, it is readily possible, if desired, to rotate the said shafts through a fixed or axially stationary member which takes the form of a bevel gear 76 keyed to said shaft connecting the element 24ᵇ and meshing with another bevel gear 77 operated by a crank 78. The said crank may obviously be located in any convenient position depending upon the character of the machine, tool or other apparatus with which the belt shifting arrangement is associated. The applicability of this arrangement to such tools as drill presses will be readily apparent to the skilled mechanic.

The arrangement is such that the apparatus is self-locking after it is moved through a complete cycle, there is no drag imposed upon the belt which, except when being shifted, runs freely through the belt guide, and nothing in the nature of skill is required in manipulating the apparatus. In addition it will be observed that the apparatus is self-contained within substantially the limits of the cones and their mountings, there being no moving parts of the apparatus which are projected into valuable space at any position of the mechanism.

By reason of the character of the parts the apparatus is well fitted for application to a wide variety of belt drives, since it is obvious that in order to fit steps having different widths of face it is merely necessary to change the throw of the crank 23 and the number of teeth in the pinion 41. In the event that standard gears do not exactly provide for the desired movement, the inclination of the guide bars 39 may be changed to vary the effective movement projected on the axis of the cone. As has been stated, the belt guide itself is universally adjustable upon the belt slide.

The described details of construction and operation are in no sense any limitation upon the invention, the scope of which can be determined by the language of the appended claims, said claims being construed as broadly as possible consistent with the state of the art.

I claim:

1. The combination of a pair of members, a belt guide on one of said members, the other member being stationary, a shaft having a crank positioned on one of said members whereby movement of said shaft toward or from the belt is normally prevented and rotation of said shaft results in movement of said shaft toward or from said belt, and means connecting said shaft to said belt guide whereby rotary movement of said shaft is translated into a linear movement of the belt guide toward or away from said shaft.

2. In a belt shifter for a pair of stepped cone pulleys, the combination of a horizontal movable belt guide adjacent each cone, a stationary supporting frame adjacent each belt guide, a rotary shaft mounted on said supporting frame, means for rotating said shaft, and a pair of mechanisms respectively adjacent to said shaft and connecting opposite ends of said shaft with said belt guides and operative upon rotation of said shaft alternately and successively to positively shift said guides.

3. In a belt shifter of the class described, the combination of a stationary support, a belt guide, a shaft having its axis generally parallel with the line of the belt and provided with an offset, said offset being connected to said support so as to prevent movement of said offset toward or from the belt while permitting rotation of said shaft and movement of the latter toward or from said belt, and gearing connecting said shaft and said belt guide, whereby the rotary movement of said shaft results in a linear movement of the belt guide with reference to said shaft.

4. In a belt shifter of the class described, the combination of a pair of members, a belt guide on one of said members, the other member being stationary, a rotary element planetary around one of said members, its rotary movement being governed and controlled by its planetary movement, and means connected to the other of said pair of members and operatively engaging said rotary element whereby said rotary movement is translated into a uniform linear movement of the belt guide with reference to the said rotary element.

5. In a belt shifting device of the class described, the combination of a pair of relatively movable parts, one of said parts having a belt guide thereon and the other part being stationary, a member mounted to move planetarily around an axis on one of said parts and rotatably mounted around its own axis, its own rotary movement being governed and controlled by its planetary movement, and rack and pinion means connecting said planetary member with the other part.

6. In a belt shifting device of the class described, the combination of a pair of parts, one of said parts having a belt guide thereon and the other part being stationary, a pinion mounted to rotate planetarily in an orbit the axis of which is fixed on one of said parts, said pinion being rotary, its rotary movement being controlled and governed by its planetary movement in said orbit, and a rack rollingly engaged by said pinion and connected to the other part.

7. In a belt shifting device of the class described, the combination of a belt guide, a pinion having an arm projecting radially therefrom, the end of said arm being stationarily pivoted whereby rotary movement of said arm around said stationary pivotal axis will effect planetary movement of the pinion around said axis and a resultant rotary movement of said pinion around its own axis, and a rack rollingly engaged by said pinion and connected to said belt guide.

8. In a belt shifting device of the class described, the combination of a belt guide, a pinion having an arm projecting radially therefrom, the end of said arm being stationarily pivoted whereby rotary movement of said arm around said stationary pivotal axis will effect planetary movement of the pinion around said axis and a resultant rotary movement of said pinion around its own axis, and a rack rollingly engaged by said pinion and connected to said belt guide, the radius of said arm being substantially equal to a quarter of the pinion pitch circumference whereby half a revolution of said pinion will be effective to move said belt guide and the other half of the revolution will be ineffective substantially to move the same.

9. In a belt shifting device of the class described, the combination of a pinion and arm fixed to said pinion, the end of said arm being stationarily pivoted, a housing in which said pinion is adapted to rotate, a part projecting from said housing and slidably carrying a belt guide, means for manually rotating said pinion around said arm pivot and thereby rotating said pinion on its own axis in said housing, and a rack connected to said belt guide and rollingly engaged by said pinion.

10. In a belt shifting device of the class described, the combination of a pinion and arm fixed to said pinion, the end of said arm being stationarily pivoted, a housing in which said pinion is adapted to rotate, a part projecting from said housing and slidably carrying a belt guide, means for manually rotating said pinion around said arm pivot and thereby rotating said pinion on its own axis in said housing, and a flexible rack trained around and engaging said pinion and having one of its ends secured to said belt guide.

11. In a belt shifter of the character described, the combination of a reciprocal bar, a guide permitting slidable movement of one end of said bar, a belt fork slidable on said bar, a pinion rotatably mounted on the other side of said bar, an arm projecting radially from the axis of said pinion, a stationary pivot for the end of said arm, means for rotating said pinion around said arm pivot and thereby rotating said pinion on said bar, and an inextensible rack member one end of which is connected to said belt guide and the other end of which rollingly engages said pinion.

12. In a belt shifter of the character described, the combination of a reciprocal bar, a guide permitting slidable movement of one end of said bar, a belt fork slidable on said bar, a pinion rotatably mounted on the other side of said bar, an arm projecting radially from the axis of said pinion, a stationary pivot for the end of said arm, means for rotating said pinion around said arm pivot and thereby rotating said pinion on said bar, and a flexible inextensible rack member one end of which is connected to said belt guide and the other end of which rollingly engages said pinion, said rack means being provided with idler means at the slidable end of said bar whereby said flexible rack means may be effective to advance or retract said belt guide along said bar.

13. In a belt shifter for a pair of stepped cone pulleys, the combination with a generally stationary shaft extending substantially parallel with the general line of the belt connecting said pulleys and a pair of mechanisms located at the respective ends of said shaft adjacent the belt pulleys, each of said mechanisms comprising an offset on said shaft, the end of said offset being supported relatively stationary with reference to movement in a direction toward or from the belt, whereby on rotation of said shaft, the end of said shaft is moved toward or away from the belt, a guide for the belt and gearing operative on rotation of said shaft to move the belt guide toward or away from said shaft.

14. In a belt shifter for a pair of stepped cone pulleys, the combination with a generally stationary shaft extending substantially parallel with the general line of the belt connecting said pulleys and a pair of mechanisms located at the respective ends of said shaft adjacent the belt pulleys, each of said mechanisms comprising an offset on said shaft, the end of said offset being supported relatively stationary with reference to movement in a direction toward or from the belt, whereby on rotation of said shaft, the end of said shaft is moved toward or away from the belt, a guide for the belt and gearing operative on rotation of said shaft to move the belt guide uniformly toward or away from said shaft, the offset at one end of said shaft being offset 180° relative to the crank on the other end of said shaft whereby upon rotation, the ends of said shaft will be moved in opposite directions.

15. In a belt shifter for a pair of stepped cone pulleys, the combination with a generally stationary shaft extending substantially parallel with the general line of the belt connecting said pulleys and a pair of mechanisms located at the respective ends of said shaft adjacent the belt pulleys, each of said mechanisms comprising an offset on said shaft, the end of said offset being supported relatively stationary with reference to movement in a direction toward or from the belt, whereby on rotation of said shaft, the end of said shaft is moved toward or away from the belt, a guide for the belt and gearing operative on rotation of said shaft to move the belt guide uniformly toward or away from said shaft end, the throw of the offset being substantially one-fourth of the relative movement of the belt guide due to a revolution of the shaft.

16. In a belt shifter for a pair of stepped cone pulleys, the combination of a horizontally movable belt guide adjacent each cone, a pair of mechanisms respectively connected to said belt guides, a unitary rotary shaft for actuating both of said mechanisms and serving normally to support said mechanisms against lateral movements and stationary parts for rotatably supporting the opposite ends of said shaft.

17. In a belt shifter for a pair of stepped cone pulleys, the combination of a movable belt guide adjacent each cone, a stationary supporting frame adjacent each belt guide, a rotary shaft mounted on said supporting frame, means for rotating said shaft, and a pair of mechanisms respectively adjacent to said shaft connected to said belt guides and operative by rotary movement of said shaft alternatively positively to shift said belt guides, said shaft also serving normally to prevent lateral movements of said mechanisms.

ROBERT SPURGIN, Jr.